(12) United States Patent
Smiddy (10) Patent No.: US 10,105,894 B1
(45) Date of Patent: *Oct. 23, 2018

(54) COMPRESSION ROLLER DESIGN AND METHOD FOR ADDITIVE MANUFACTURING

(71) Applicant: Thermwood Corporation, Dale, IN (US)

(72) Inventor: Brian S. Smiddy, Newburgh, IN (US)

(73) Assignee: Thermwood Corporation, Dale, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/950,724

(22) Filed: Apr. 11, 2018

Related U.S. Application Data (63) Continuation of application No. 15/805,496, filed on Nov. 7, 2017, now Pat. No. 9,969,122.

(51) Int. Cl.
| | |
|---|---|
| *B29C 64/209* | (2017.01) |
| *B33Y 30/00* | (2015.01) |
| *B29C 35/16* | (2006.01) |
| *B29C 64/20* | (2017.01) |
| *B29K 81/00* | (2006.01) |
| *B29K 105/06* | (2006.01) |

(52) U.S. Cl.
CPC ............ *B29C 64/209* (2017.08); *B29C 35/16* (2013.01); *B29C 64/20* (2017.08); *B33Y 30/00* (2014.12); *B29K 2081/04* (2013.01); *B29K 2105/06* (2013.01)

(58) Field of Classification Search
None
See application file for complete search history.

(56) References Cited

U.S. PATENT DOCUMENTS

| | | | |
|---|---|---|---|
| 6,372,178 B1 | 4/2002 | Tseng | |
| 9,796,140 B2* | 10/2017 | Page | ............ B29C 64/106 |
| 2005/0104241 A1 | 5/2005 | Kritchman et al. | |
| 2011/0147993 A1* | 6/2011 | Eshed | ............ B33Y 10/00 |
| | | | 264/308 |
| 2015/0290875 A1* | 10/2015 | Mark | ............ B29C 70/20 |
| | | | 264/138 |
| 2015/0367375 A1* | 12/2015 | Page | ............ B29C 67/0055 |
| | | | 118/697 |
| 2015/0367576 A1* | 12/2015 | Page | ............ B29C 67/0059 |
| | | | 264/257 |
| 2016/0046073 A1* | 2/2016 | Hadas | ............ B29C 67/0085 |
| | | | 264/211.21 |
| 2016/0236408 A1 | 8/2016 | Wolf et al. | |
| 2016/0297110 A1* | 10/2016 | Wu | ............ B29C 35/16 |
| 2017/0106601 A1* | 4/2017 | Page | ............ B33Y 10/00 |
| 2017/0225391 A1* | 8/2017 | Kritchman | ............ B29C 67/0059 |
| 2017/0341300 A1* | 11/2017 | Rudolph | ............ B29C 64/386 |
| 2018/0015674 A1* | 1/2018 | Page | ............ B29C 64/386 |

* cited by examiner

*Primary Examiner* — Jacob T Minskey
*Assistant Examiner* — Baileigh Kate Darnell
(74) *Attorney, Agent, or Firm* — Bookoff McAndrews, LLC (57) ABSTRACT

An additive manufacturing system may include a nozzle having an inlet for receiving a flowable material and an outlet for depositing the flowable material. The system also may include an applicator head surrounding at least a portion of the nozzle. Additionally, a roller may be mounted on the applicator head and rotatable about an axle. A coolant circuit may extend through at least a portion of the applicator head and through a lumen of the axle.

20 Claims, 5 Drawing Sheets

Fig. 5B

COMPRESSION ROLLER DESIGN AND METHOD FOR ADDITIVE MANUFACTURING

CROSS-REFERENCE TO RELATED APPLICATIONS

This application is a continuation application of U.S. application Ser. No. 15/805,496, filed Nov. 7, 2017, the entirety of which is herein incorporated by reference.

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., three-dimensional (3D) printing.

BACKGROUND

Additive manufacturing techniques and processes generally involve the buildup of one or more materials, e.g., layering, to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is commonly known as 3D printing. One such process, commonly referred to as Fused Deposition Modeling (FDM), or Fused Layer Modeling (FLM), comprises melting a thin layer of thermoplastic material and applying this material in layers to produce a final part. This is commonly accomplished by passing a continuous, thin filament of thermoplastic material through a heated nozzle, or by passing thermoplastic material into an extruder with an attached nozzle, which melts the thermoplastic material into and applies it to the structure being printed, building up the structure. The heated material may be applied to the existing structure in layers, melting and fusing with the existing material to produce a solid finished part.

The filament used in the aforementioned process may be produced, for example, by using a plastic extruder. This plastic extruder includes a steel screw configured to rotate inside of a heated steel barrel. Thermoplastic material in the form of small pellets may be introduced into one end of the rotating screw. Friction from the rotating screw, combined with heat from the barrel may soften the plastic, which may then be forced under pressure through a small round opening in a die that is attached to the front of the extruder barrel. In doing so, a "string" of material may be extruded, after which the extruded "sting" of material may be cooled and coiled up for use in a 3D printer or other additive manufacturing system.

Melting a thin filament of material in order to 3D print an item may be a slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of larger parts or a larger number of items.

A common method of additive manufacturing, or 3D printing, may include forming and extruding a bead of flowable material (e.g., molten thermoplastic), applying the bead of material in a strata of layers to form a facsimile of an article, and machining the facsimile to produce an end product. Such a process may be achieved using an extruder mounted on a computer numeric controlled (CNC) machine with controlled motion along at least the x, y, and z-axes. In some cases, the flowable material, such as, e.g., molten thermoplastic material, may be infused with a reinforcing material (e.g., strands of fiber or a combination of materials) to enhance the material's strength.

The flowable material, while generally hot and pliable, may be deposited upon a substrate (e.g., a mold), pressed down, or otherwise flattened to some extent, and leveled to a consistent thickness, preferably by means of a tangentially compensated roller mechanism. The compression roller may be mounted in or on a rotatable carriage, which may be operable to maintain the roller in an orientation tangential, e.g., perpendicular, to the deposited material (e.g., bead or beads). In some embodiments, the compression roller may be smooth and/or solid. The flattening process may aid in fusing a new layer of the flowable material to the previously deposited layer of the flowable material. The deposition process may be repeated so that successive layers of flowable material are deposited upon an existing layer to build up and manufacture a desired component structure. In some instances, an oscillating plate may be used to flatten the bead of flowable material to a desired thickness; thus, effecting fusion to the previously deposited layer of flowable material. The deposition process may be repeated so that successive layers of flowable material are deposited upon an existing layer to build up and manufacture a desired component structure. When executed properly, the new layer of flowable material may be deposited at a temperature sufficient to allow the new layer of such material to melt and fuse with a previously deposited layer in order to produce a solid part.

In some instances, the process of 3D printing a part may involve a two-step process. For example, the process may utilize a large print bead to achieve an accurate final size and shape. This two-step process, commonly referred to as near-net-shape, may begin by printing a part to a size slightly larger than needed, then machining, milling, or routing the part to the final size and shape. The additional time required to trim the part to a final size may be compensated for by the faster printing process.

There are two fundamental requirements for a compression roller to function properly when flowable material is pressed down or otherwise flattened to some extent, and leveled to a consistent thickness. First, the compression roller preferably rotates freely with little or no rotational friction or restriction to rotary motion. Friction in the rotation of the compression roller may exert an undesirable force on the melted bead during the print process, possibly distorting the print geometry. Second, the compression roller preferably remains at a temperature that is below the melting temperature of the material being processed. This may be especially important when processing certain high temperature polymers such as, for example, polyphenylene sulfide (PPS), which may have an affinity for, and chemical attraction to, hot metal. When the compression roller reaches a certain temperature, the polymer being processed may adhere to the compression roller. Such adhesion may result in the compression roller jamming and/or the part being printed to sustain serious enough defects to render it unusable.

Early efforts to cool a compression roller may blow cooled air on the compression roller in an effort to remove enough heat to keep the temperature below the melting temperature of the material being processed. While such an approach may achieve adequate results for certain polymers that may be processed at lower temperatures, such a stream of cooled air may impart undesirable effects. For example, such a stream of cooled air may result in cooling of the print nozzle. Cooling of the print nozzle may negatively affect the temperature of the print bead, which may result in print process problems. Additionally, blowing cooled air on the compression roller may not remove sufficient heat from the compression roller when processing higher temperature polymers. For example, PPS may be processed at temperatures of 650° F. or higher to prevent the roller temperature from rising to a level that promotes adhesion of the polymer to the compression roller and blowing cooled air on the compression roller may not adequately remove heat.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects. A principal object of the present disclosure is to develop a print compression roller design that can simultaneously maintain a freewheeling compression roller with little to no rotational friction while cooling it at a rate sufficient to keep it at a temperature below which polymer adhesion occurs.

This system uses cooled liquid instead of air as the cooling means. Cooled liquid represents a much more efficient method of transferring heat than does air cooling. The cooled liquid may be first routed through a rotary union which may have an opening large enough in diameter to allow the heated print nozzle to pass therethrough. The compression roller assembly may be attached to this rotating mechanism so that the compression roller rotates about the print nozzle. This rotational motion may be generated by a servomotor connected to the rotary union via one or more belt(s) and pulley(s). As such, the compression roller may be cooled regardless of the orientation of the compression roller about the print nozzle.

Cooling liquid may be directed through a hole or lumen bored through a center of an axle on which the compression roller may be mounted. As such, the cooling liquid may directly cool the axle. Since the compression roller may be mounted to the axle, the cooling liquid may also cool the compression roller. The fixed, non-rotating axle may be positioned within a lumen of the compression roller. One or more low friction bearing(s) may be located at each end of the compression roller so as to provide a rotational mounting between the axle and the compression roller, thereby allowing the compression roller to rotate about the axle. Although a layer of air may be present in a gap between the axle and the compression roller, such a layer of air may offer little resistance to the transfer of heat from the compression roller to the cooled axle. As such, the compression roller may be cooled while maintaining nearly friction free rotation relative to the axle. Additionally, the gap between the axle and the compression roller may be filled with a material with better heat transfer properties than air. For example, a material such as atomized copper powder may be positioned in the gap. As an alternative, a low viscosity material such as copper filled anti-seize compound may be positioned in the gap. Such materials may impart only a slight increase in rotational friction between the axle and the compression roller, while offering a dramatic increase in heat transfer properties, thereby permitting heat transfer between the compression roller and the axle.

The approach described herein may utilize a tubular compression roller. A lumen of the compression roller may have a central portion and end portions. Each end portion may have a cross-sectional dimension (e.g., diameter) larger than a cross-sectional dimension (e.g., diameter) of the central portion. In other words, the lumen of the compression roller may be stepped. Additionally, at least one or all of the central portion or the end portions may have a straight and/or smooth surface. Additionally, the compression roller may have an outer cross-sectional dimension (e.g., diameter) configured for proper printing. A wall thickness of the compression roller may be minimized while maintaining a necessary structural strength configured to compress beads of molten material deposited by the print nozzle. Additionally, as the compression roller may be a tubular structure rather than a solid metal roller, rotary inertia of the compression roller may be reduced thereby benefiting the printing process during periods of acceleration and deceleration of the compression roller.

Optionally, both of the axle and compression roller may comprise and/or be fabricated from copper, which is a metal that readily transmits heat. In other arrangements, however, the axle and compression roller may be comprised and/or fabricated from other metals or materials which might offer physical or chemical advantages when processing certain polymers such as, for example, PPS.

In one example, an additive manufacturing system may include a nozzle having an inlet for receiving a flowable material and an outlet for depositing the flowable material. The system also may include an applicator head surrounding at least a portion of the nozzle. Additionally, a roller may be mounted on the applicator head and rotatable about an axle. A coolant circuit may extend through at least a portion of the applicator head and through a lumen of the axle.

In a further example, an additive manufacturing system may include a nozzle having an inlet for receiving a flowable material and an outlet for depositing the flowable material. The system may further include an applicator head surrounding at least a portion of the nozzle. The applicator head may include a first barb and a second barb. A roller may be mounted on the applicator head and rotatable about an axle. Additionally, a coolant circuit may extend through the first barb, the second barb, and a lumen of the axle.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components via additive manufacturing, such as, e.g., via 3D printing. Specifically, the methods and apparatus described herein may be drawn to a compression roller configured to rotate about an axle with little to no rotational friction while cooling the compression roller at a rate sufficient to keep compression roller at a temperature below which polymer adhesion occurs, and methods of using the same.

For purposes of brevity, the methods and apparatus described herein will be discussed in connection with the fabrication of parts from thermoplastic materials. However, those of ordinary skill in the art will readily recognize that the disclosed apparatus and methods may be used with any flowable material suitable for additive manufacturing.

Figure 1:
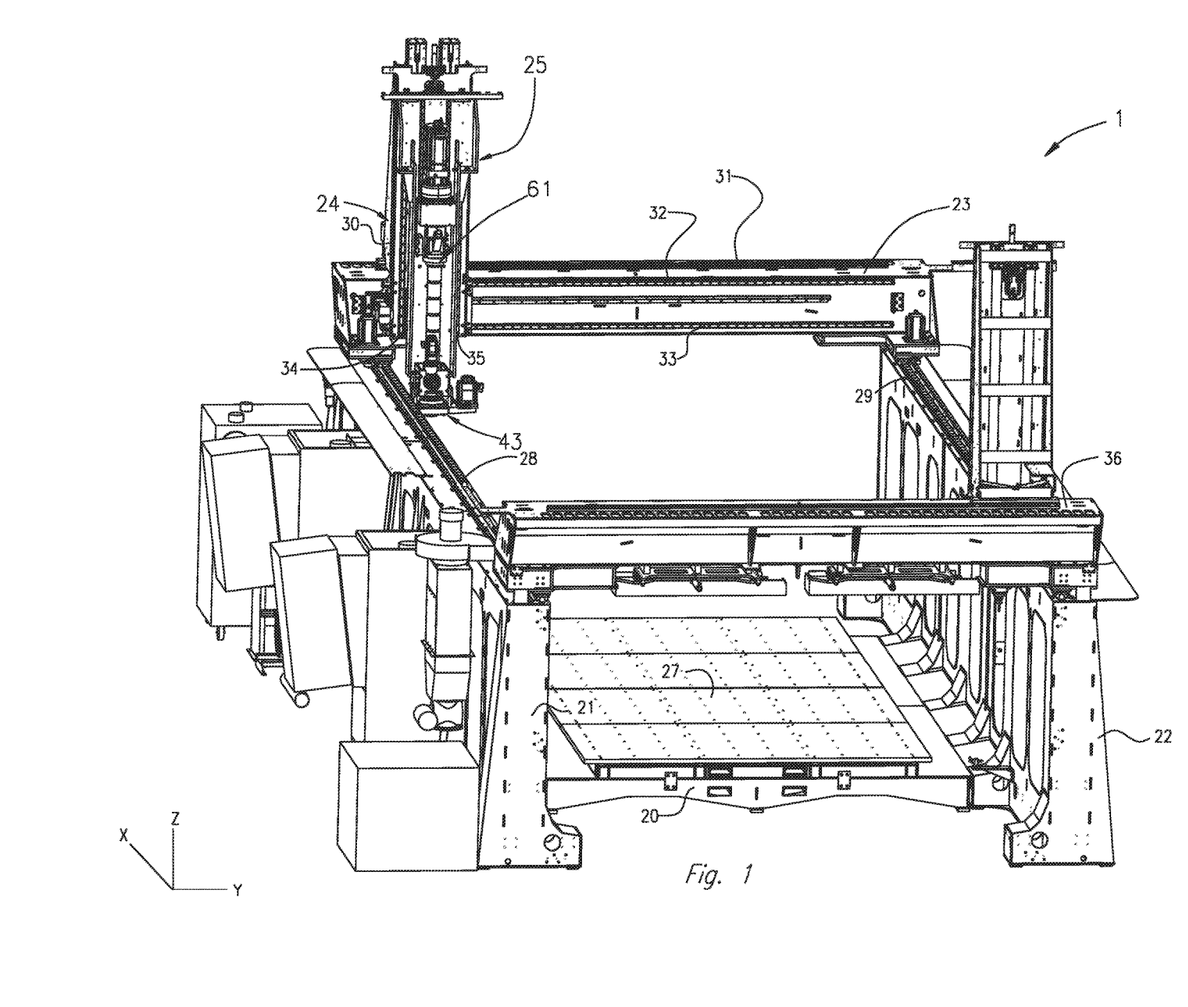
FIG. 1 is a perspective view of an exemplary CNC machine operable pursuant to an additive manufacturing process to form articles, according to an aspect of the present disclosure.

Referring to FIG. 1, there is illustrated a CNC machine 1 embodying aspects of the present disclosure. A controller (not shown) may be operatively connected to CNC machine 1 for displacing an application nozzle along a longitudinal line of travel, or x-axis, a transverse line of travel, or a y-axis, and a vertical line of travel, or z-axis, in accordance with a program inputted or loaded into the controller for performing an additive manufacturing process to form a desired component. CNC machine 1 may be configured to print or otherwise build 3D parts from digital representations of the 3D parts (e.g., AMF and STL format files) programmed into the controller.

For example, in an extrusion-based additive manufacturing system, a 3D part may be printed from a digital representation of the 3D part in a layer-by-layer manner by extruding a flowable material (e.g., thermoplastic material with or without reinforcements). The flowable material may be extruded through an extrusion tip or nozzle carried by a print head of the system, and the flowable material may be deposited as a sequence of beads or layers on a substrate in an x-y plane. The extruded, flowable material may fuse to a previously deposited layer of material and may solidify upon a drop in temperature. The position of the print head relative to the substrate may then be incrementally advanced along a z-axis (perpendicular to the x-y plane), and the process may then be repeated to form a 3D part resembling the digital representation.

Machine 1 shown in FIG. 1 includes a bed 20 provided with a pair of transversely spaced side walls 21 and 22, a printing gantry 23 and a trimming gantry 36 supported on opposing side walls 21 and 22, a carriage 24 mounted on printing gantry 23, a carrier 25 mounted on carriage 24, an extruder 61, and an applicator assembly (also referred to herein as an applicator head) 43 mounted on carrier 25. Located on bed 20 between side walls 21 and 22 is a worktable 27 provided with a support surface. The support surface may be disposed in an x-y plane and may be fixed or displaceable along an x-axis and/or a y-axis. For example, in a displaceable version, worktable 27 may be displaceable along a set of rails mounted on bed 20. Displacement of worktable 27 may be achieved using one or more servomotors and one or more of guide rails 28 and 29 mounted on bed 20 and operatively connected to worktable 27. Printing gantry 23 is disposed along a y-axis, supported on side walls 21 and 22. In FIG. 1, printing gantry 23 is mounted on the set of guide rails 28, 29, which are located along a top surface of side walls 21 and 22.

Printing gantry 23 may either be fixedly or displaceably mounted, and, in some aspects, printing gantry 23 may be disposed along an x-axis. In an exemplary displaceable version, one or more servomotors may control movement of printing gantry 23. For example, one or more servomotors may be mounted on printing gantry 23 and operatively connected to tracks, e.g., guide rails 28, 29, provided on the side walls 21 and 22 of bed 20.

Carriage 24 is supported on printing gantry 23 and is provided with a support member 30 mounted on and displaceable along one or more guide rails 31, 32, and 33 provided on printing gantry 23. Carriage 24 may be displaceable along a y-axis on one or more guide rails 31, 32, and 33 by a servomotor mounted on printing gantry 23 and operatively connected to support member 30. Carrier 25 is mounted on one or more vertically disposed guide rails 34 and 35 supported on carriage 24 for displacement of carrier 25 relative to carriage 24 along a z-axis. Carrier 25 may be displaceable along the z-axis by a servomotor mounted on carriage 24 and operatively connected to carrier 25.

Figure 2:
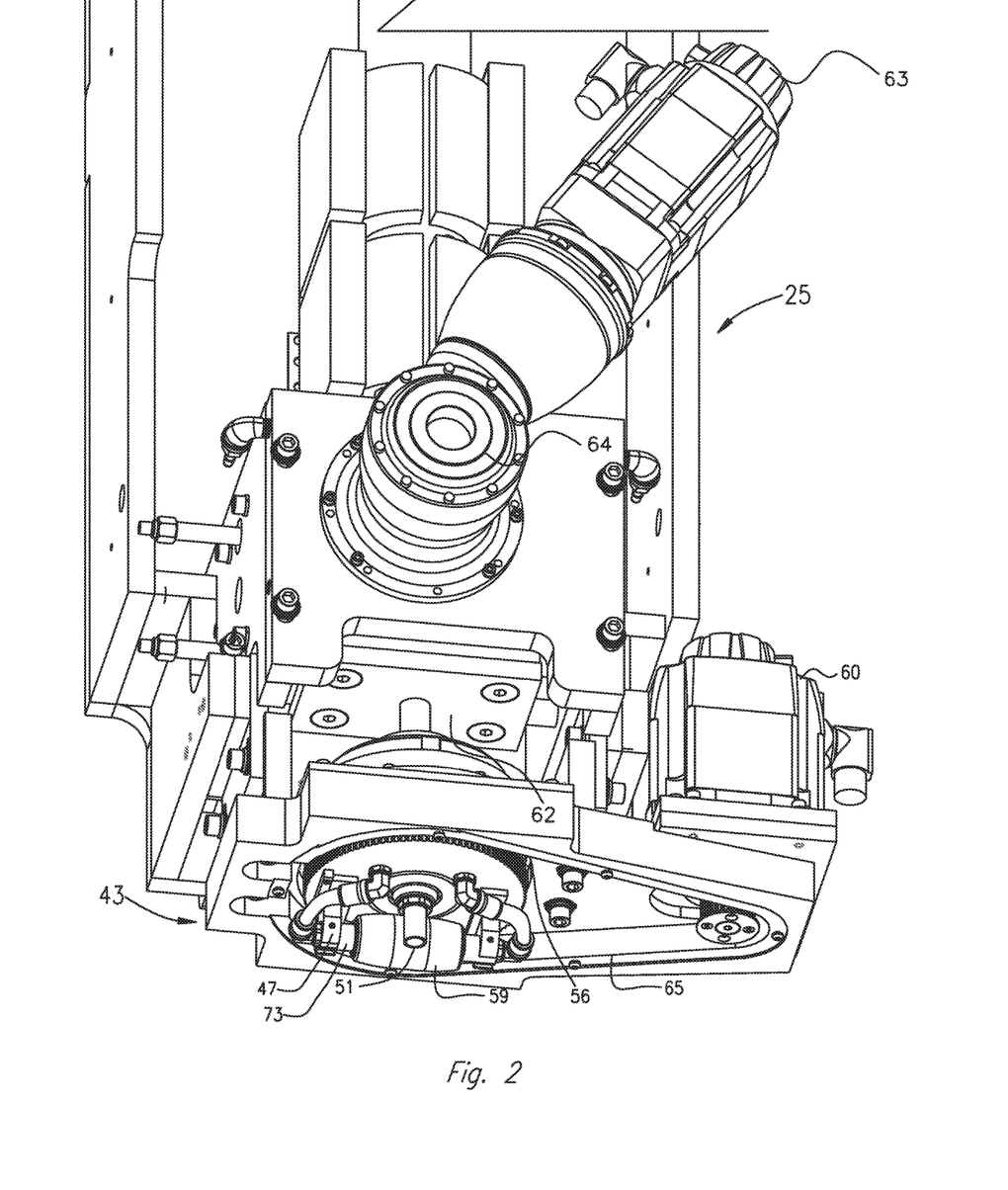
FIG. 2 is an enlarged perspective view of an exemplary carrier and applicator head assembly, including an exemplary roller, of the exemplary CNC machine shown in FIG. 1.

As best shown in FIG. 2, mounted to the bottom of carrier 25 is a positive displacement gear pump 62, which may be driven by a servomotor 63, through a gearbox 64. Gear pump 62 may receive molten plastic from the extruder 61, shown in FIG. 1.

Figure 3:
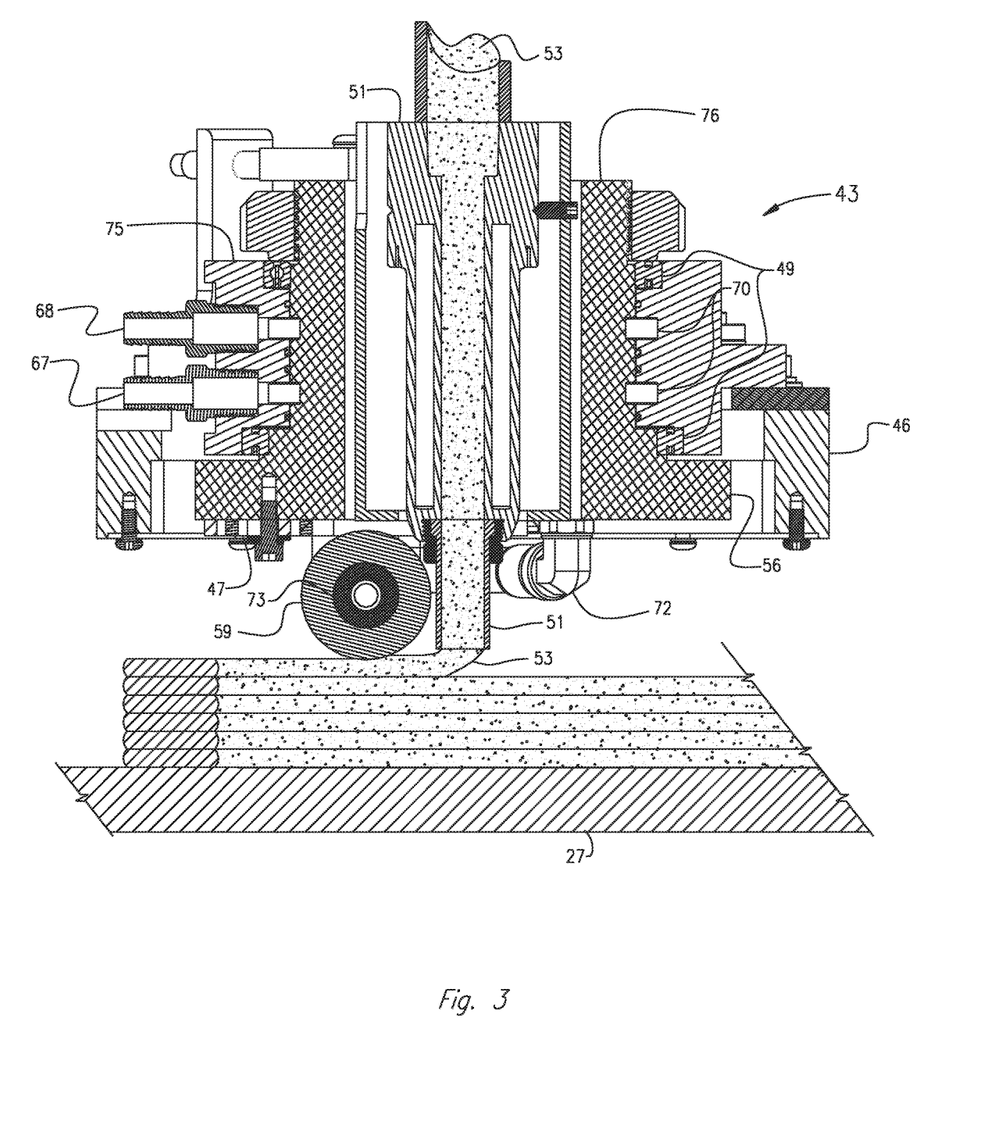
FIGS. 3 and 4 are enlarged cutaway views of the exemplary applicator head assembly shown in FIG. 2, each view being from a different angle of the exemplary applicator head assembly shown in FIG. 2.

A compression roller 59, rotatable about a fixed or non-rotatable (e.g., fixed) axle 73, for compressing deposited flowable material (e.g., thermoplastic material) may be mounted on a carrier bracket 47. Roller 59 may be movably mounted on carrier bracket 47, for example, rotatably or pivotably mounted. Roller 59 may be mounted so that a center portion of roller 59 is aligned with a nozzle 51, and roller 59 may be oriented tangentially to nozzle 51. Roller 59 may be mounted relative to nozzle 51 so that material, e.g., one or more beads of flowable material (such as thermoplastic resins), discharged from nozzle 51 is smoothed, flattened, leveled, and/or compressed by roller 59, as depicted in FIG. 3. One or more servomotors 60 may be configured to move, e.g., rotationally displace, carrier bracket 47 via a pulley 56 and belt 65 arrangement. In some embodiments, carrier bracket 47 may be rotationally displaced via a sprocket and drive-chain arrangement (not shown), or by any other suitable mechanism.

As shown in FIG. 3, application head 43 may include a housing 46 having a rotary union mounted therein. Such a rotary union may include an inner hub 76 rotatably mounted within and relative to an outer housing 75. For example, inner hub 76 may rotate about a longitudinal axis thereof relative to outer housing 75 via one or more roller bearings 49. Carrier bracket 47 may be mounted, e.g., fixedly mounted, to inner hub 76, journaled in roller bearing 49. Roller bearing 49 may allow roller 59 to rotate about nozzle 51. As nozzle 51 extrudes material 53, roller bearing 49 may rotate, allowing roller 59 to rotate relative to nozzle 51 in order to follow behind the path of nozzle 51 to flatten deposited material 53 as nozzle 51 moves in different directions. As shown in FIG. 3, an oversized molten bead of a flowable material 53 (e.g., a thermoplastic material) under pressure from a source disposed on carrier 25 (e.g., one or more extruder 61 and an associated polymer or gear pump) may be flowed to applicator head 43, which may be fixedly (or removably) connected to, and in communication with, nozzle 51. In use, flowable material 53 (e.g., melted thermoplastic material) may be heated sufficiently to form a large molten bead thereof, which may be delivered through applicator nozzle 51 to form multiple rows of deposited material 53 on a surface of worktable 27. In some embodiments, beads of molten material deposited by nozzle 51 may be substantially round in shape prior to being compressed by roller 59. Exemplary large beads may range in size from approximately 0.4 inches to over 1 inch in diameter. For example, a 0.5 inch bead may be deposited by nozzle 51 and then flattened by roller 59 to a layer approximately 0.2 inches thick by approximately 0.83 inches wide. Such large beads of molten material may be flattened, leveled, smoothed, and/or fused to adjoining layers by roller 59. Each successive printed layer may not cool below the temperature at which proper layer-to-layer bonding occurs before the next layer is added.

In some embodiments, flowable material 53 may include a suitable reinforcing material, such as, e.g., fibers, that may facilitate and enhance the fusion of adjacent layers of extruded flowable material 53. In some aspects, flowable material 53 may be heated sufficiently to form a molten bead and may be delivered through nozzle 51 to form multiple rows of deposited flowable material onto a surface of worktable 27. In some aspects, flowable material 53 delivered onto a surface of worktable 27 may be free of trapped air, the rows of deposited material may be uniform, and/or the deposited material may be smooth. For example, flowable material 53 may be flattened, leveled, and/or fused to adjoining layers by any suitable means (e.g., roller 59), to form an article. In some embodiments, a tangentially oriented roller 59 may be used to compress flowable material 53 discharged from nozzle 51.

Although roller 59 is depicted as being integral with applicator head 43, roller 59 may be separate and discrete from applicator head 43. In some embodiments, roller 59 may be removably mounted to machine 1. For example, different sized or shaped rollers 59 may be interchangeably mounted on machine 1, depending, e.g., on the type of flowable material 53 and/or desired characteristics of the rows of deposited flowable material formed on worktable 27.

In some embodiments, machine 1 may include a velocimetry assembly (or multiple velocimetry assemblies) configured to determine flow rates (e.g., velocities and/or volumetric flow rates) of deposited flowable material 53 being delivered from applicator head 43. The velocimetry assembly may transmit signals relating to the determined flow rates to the aforementioned controller coupled to machine 1, which then may utilize the received information to compensate for variations in the material flow rates.

In the course of fabricating an article or component, pursuant to the methods described herein, the control system of machine 1, in executing the inputted program, may control several servomotors described above to displace gantry 23 along the x-axis, displace carriage 24 along the y-axis, displace carrier 25 along the z-axis, and/or rotate carrier bracket 47 about the z-axis while nozzle 51 deposits flowable material 53 and roller 59 compresses the deposited material. In some embodiments, roller 59 may compress flowable material 53 in uniform, smooth rows.

A circumferential outer surface of inner hub 76 may include or define pulley 56. That is, as shown in FIG. 3, pulley 56 may include a radially outward-most portion of inner hub 76. Although pulley 56 is depicted as being integral with inner hub 76, pulley 56 may be separate and discrete from inner hub 76. Additionally, inner hub 76 may include an opening having a dimension (e.g., diameter) sufficient to allow nozzle 51 to pass therethrough.

Figure 4:
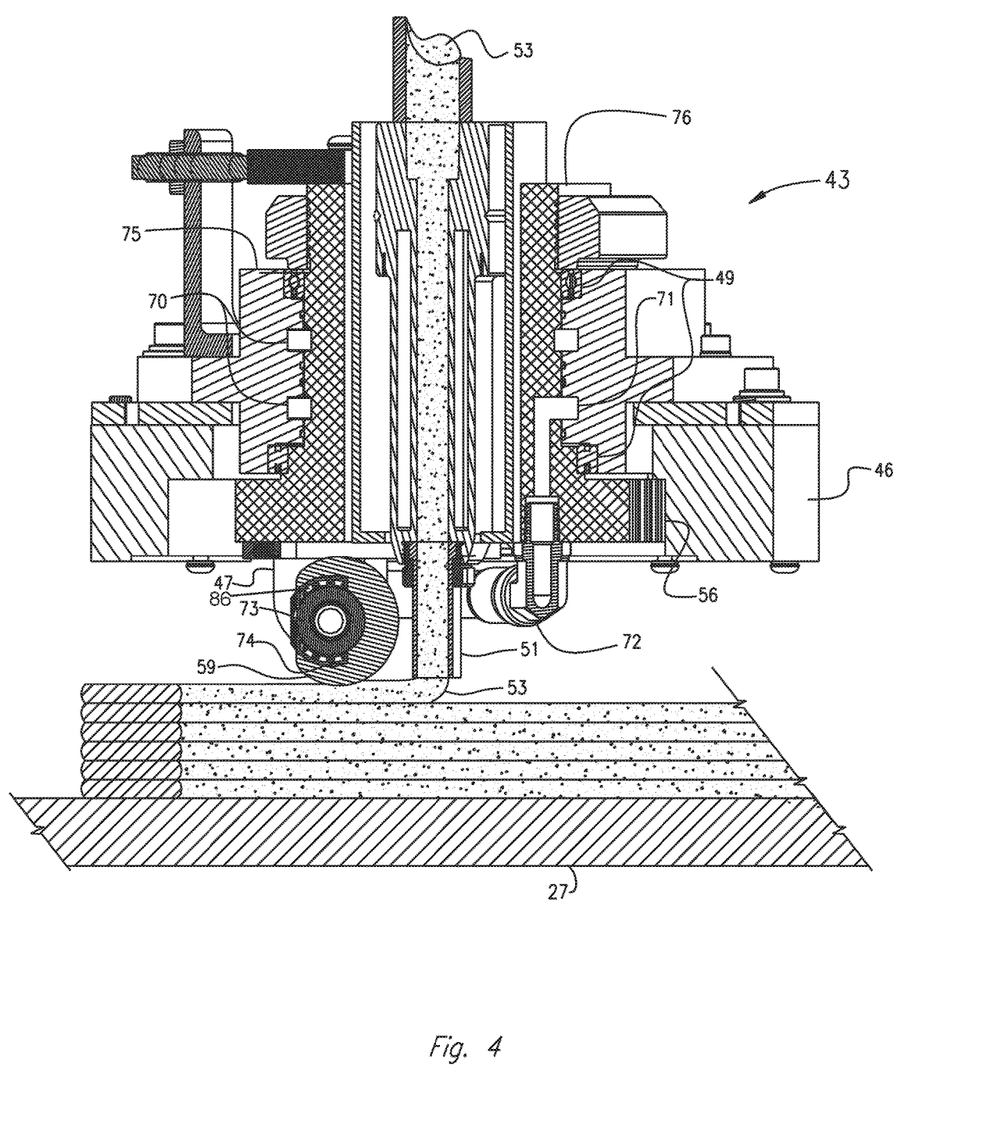

Outer housing 75 may include one or more barb fittings 67, 68. Coolant may enter a barb fitting 67 and may be introduced inside of housing 46 of application head 43. Each barb fitting 67 may be fluidly coupled to one or more passages extending through application head 43. For example, each of barb fittings 67 and 68 may be coupled to one or more coolant passages 70. As shown in FIGS. 3 and 4, coolant passages 70 may extend between outer housing 75 and inner hub 76. Additionally, coolant passages 70 may couple to one or more passages 71 and quick connect fitting 72, as shown in FIG. 4. Quick connect fitting 72, in turn, may be fluidly coupled to an interior bore, passage, or lumen extending through the axle 73 so as to directly cool the axle 73, and thereby, roller 59. Each of coolant passages 70 and passages 71 may be disposed within application head 43 to direct the coolant within application head 43 during operation of machine 1, e.g., when printing a part. As shown in FIGS. 3 and 4, for example, each of coolant passages 70 may extend along an axis generally perpendicular to the longitudinal axis of nozzle 51 while passages 71 may extend generally parallel with the longitudinal axis of nozzle 51. It is understood, however, that the disclosure is not so limited. Any or all of coolant passages 70 and/or passages 71 may extend along an axis nonparallel or nonperpendicular to the longitudinal axis of nozzle 51.

Regardless of the configuration, orientation, shape, or arrangement thereof, barb fitting 67, coolant passage 70, passage 71, quick connect fitting 72, axle 73, and barb fitting 68 may collectively form a cooling circuit for cycling or otherwise introducing and removing coolant from application head 43. For example, an inlet portion of barb fitting 67 may be fluidly connected to a source of coolant (not shown). Once within application head 43, the coolant may absorb heat and may cool outer housing 75, inner hub 76, and axle 73 as it flows therethrough. In addition, due to the proximity of roller 59 to axle 73, passage of coolant through axle 73 may result in likewise cooling of roller 59. The coolant may exit from one or more barb fittings 68 and may return to a chiller to be cooled back down to an appropriate temperature. The coolant may be cooled down to a temperature below that at which deposited material 53 may begin to adhere to roller 59. This temperature may vary depending on the type of material 53 used and may be below the melting point of that material. In some examples, the coolant may be a liquid coolant, such as, e.g., water, antifreeze, ethylene glycol, diethylene glycol, propylene glycol, betaine, or any other suitable liquid coolants or combinations thereof.

As shown in FIG. 4, axle 73 passes through a central lumen 80 (FIG. 5A) of roller 59. Additionally, one or more low friction bearing(s) 74 may be located at each end of the roller 59 (e.g., within end portions 84, FIG. 5A) so as to provide a rotational mounting between the axle 73 and the roller 59, thereby allowing the roller 59 to rotate about the axle 73, without the axle 73 contacting roller 59. Although a thin layer of air exists in a gap 86 (FIG. 4) between an outer surface of the axle 73 and a surface of the lumen 80 of roller 59, such a layer of air offers little resistance to the transfer of heat from the compression roller 59 to the cooled axle 73. In this way, it is possible to cool the compression roller 59 while maintaining nearly friction free rotation of roller 59. Additionally, the gap 86 between the axle 73 and the compression roller 59 may be filled with a material with better heat transfer properties than air. For example, a material such as atomized copper powder may be positioned in the gap 86. As an alternative, a low viscosity material such as copper filled anti-seize compound may be positioned in the gap 86. Such materials may impart only a slight increase in rotational friction between the axle 73 and the compression roller 59, while offering a dramatic increase in heat transfer properties, thereby permitting heat transfer between the compression roller 59 and the axle 73.

Figure 5A:
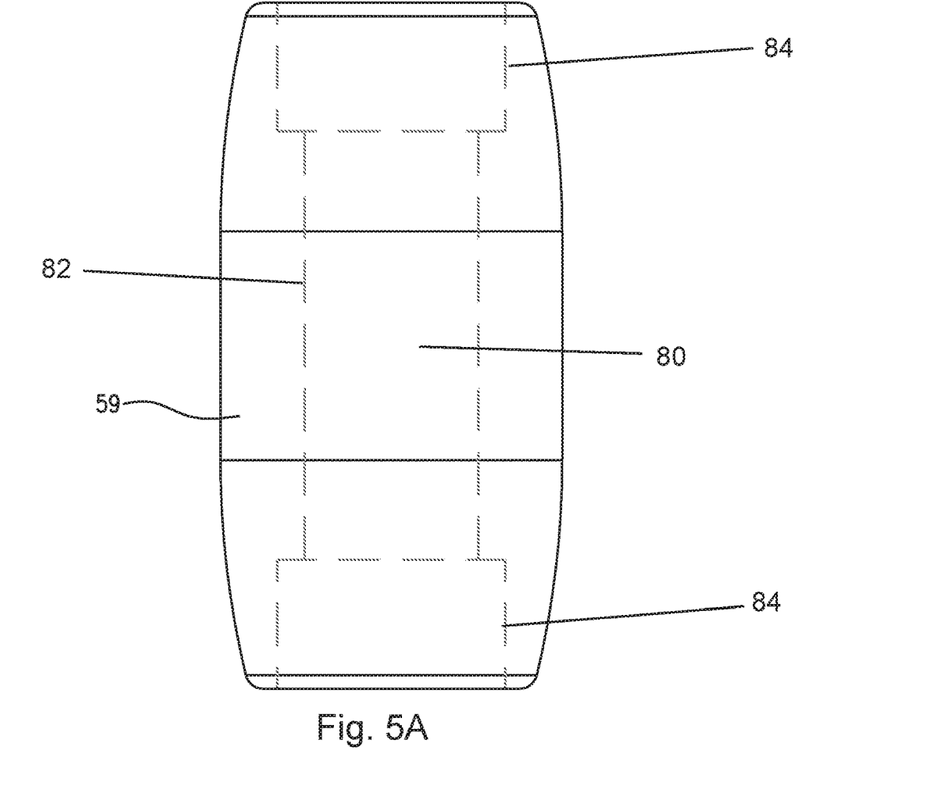
FIGS. 5A and 5B illustrate a top view and a front view of an exemplary compression roller, respectively, according to an aspect of the present disclosure.
Figure 5B:
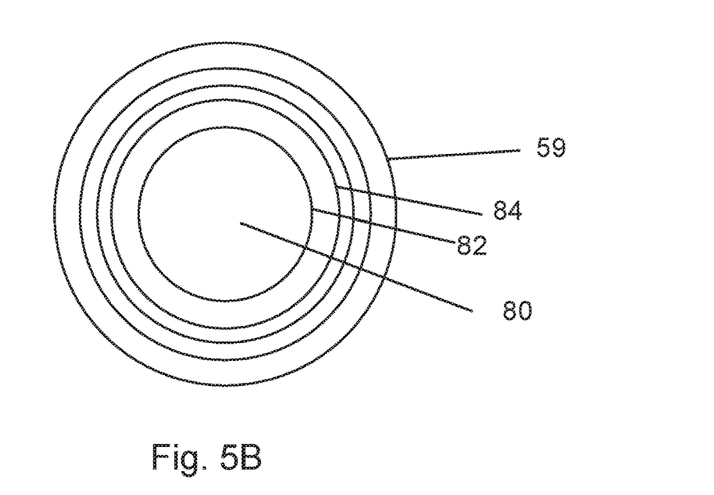

FIGS. 5A and 5B illustrate a top view and a front view, respectively, of an exemplary compression roller 59. As shown, compression roller 59 may be tubular including lumen 80 extending therethrough. Lumen 80 may include a central portion 82 and end portions 84 on opposite ends thereof. As shown, a cross-sectional dimension (e.g., diameter) of end portions 84 may be larger than a cross-sectional dimension (e.g., diameter) of central portion 82. Additionally, a cross-sectional dimension or diameter of central portion 82 may be constant (e.g., non-tapering) and a surface of lumen 80 extending through central portion 82 may be smooth. End portions 84 may each define or comprise a pocket for low friction bearing(s) 74 (e.g., needle bearings). Additionally, an outer cross-sectional diameter or dimension of roller 59 may be configured as appropriate for proper printing. A wall thickness of roller 59, between lumen 80 and a radially outer surface of roller 59, may be minimized while maintaining a necessary structural strength configured to sufficiently compress beads of molten material deposited by nozzle 51 while achieving a desired print geometry for a printed part. Additionally, since roller 59 may be a tubular structure rather than a solid metal roller, rotary inertia of the roller 59 may be reduced thereby benefiting the printing process during periods of acceleration and deceleration of roller 59.

Optionally, both axle 73 and roller 59 may comprise and/or be fabricated from copper, which is a metal that readily transmits heat. In other arrangements, however, axle 73 and roller 59 may be comprised and/or fabricated from other metals or materials which might offer physical or chemical advantages when processing certain polymers such as, for example, PPS.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. An additive manufacturing system, comprising:
an applicator head for depositing flowable material;
a roller coupled to the applicator head and rotatable about an axle; and
a coolant circuit extending through a lumen of the axle.

2. The additive manufacturing system of claim 1, wherein the applicator head includes an inner hub rotatably mounted within an outer housing.

3. The additive manufacturing system of claim 2, further including a nozzle in fluid communication with the applicator head, wherein the roller is attached to the inner hub and rotatable about the nozzle.

4. The additive manufacturing system of claim 3, wherein the roller is oriented tangentially to the nozzle.

5. The additive manufacturing system of claim 1, wherein the roller includes a lumen extending therethrough, wherein the lumen includes a varying cross-sectional dimension.

6. The additive manufacturing system of claim 1, wherein the roller includes a lumen extending therethrough, the system further including:
a pair of bearings, wherein each bearing of the pair of bearings and the axle is received within the lumen of the roller.

7. An additive manufacturing system, comprising:
a nozzle for depositing flowable material;
an applicator head fluidly connected to the nozzle;
a roller coupled to the applicator head and rotatable about an axle;
a coolant circuit extending through at least a lumen of the axle.

8. The additive manufacturing system of claim 7, wherein the roller is rotatable about the nozzle.

9. The additive manufacturing system of claim 7, wherein the roller is tangentially oriented with respect to the nozzle.

10. The additive manufacturing system of claim 7, wherein the applicator head includes an outer housing and an inner hub rotatably mounted within the outer housing.

11. The additive manufacturing system of claim 10, wherein the coolant circuit extends between a portion of the outer housing and a portion of the inner hub.

12. The additive manufacturing system of claim 7, wherein the roller includes a lumen extending therethrough, wherein the lumen of the roller includes a pair of end portions and a central portion positioned therebetween, wherein a cross-sectional dimension of each end portion is larger than a cross-sectional dimension of the central portion.

13. The additive manufacturing system of claim 7, further including at least one coolant within the coolant circuit, wherein the coolant includes at least one of water, antifreeze, ethylene glycol, diethylene glycol, propylene glycol, betaine, or combinations thereof.

14. An additive manufacturing system, comprising:
an applicator head for depositing flowable material;
a roller attached to the applicator head and rotatable about an axle;
a coolant circuit extending through at least part of the applicator head or a lumen of the axle.

15. The additive manufacturing system of claim 14, wherein the applicator head includes an outer housing and an inner hub, wherein the inner hub is rotatable with respect to the outer housing via at least one roller bearing, and wherein the coolant circuit extends through at least part of the inner hub.

16. The additive manufacturing system of claim 15, wherein the axle is nonrotatable with respect to a longitudinal axis of the axle.

17. The additive manufacturing system of claim 14, wherein the applicator head includes one or more barb fittings fluidly coupled to the coolant circuit.

18. The additive manufacturing system of claim 14, further including a gap between a radially inner surface of the roller and a radially outer surface of the axle.

19. The additive manufacturing system of claim 18, further including a material having a higher thermal conductivity than air, wherein the material is positioned in the gap.

20. The additive manufacturing system of claim 14, wherein at least one or both of the roller or the axle includes copper.

* * * * *